May 11, 1954　　E. O. RUE ET AL　　2,678,026
PIG FEEDER

Filed Nov. 14, 1952　　3 Sheets-Sheet 1

Edward O. Rue
Arthur G. Fredeen
INVENTORS

May 11, 1954 E. O. RUE ET AL 2,678,026
PIG FEEDER
Filed Nov. 14, 1952 3 Sheets-Sheet 2

Edward O. Rue
Arthur G. Fredeen
INVENTORS

BY
Attorneys

May 11, 1954   E. O. RUE ET AL   2,678,026
PIG FEEDER
Filed Nov. 14, 1952   3 Sheets-Sheet 3

Edward O. Rue
Arthur G. Fredeen
INVENTORS.

BY
Attorneys

Patented May 11, 1954

2,678,026

UNITED STATES PATENT OFFICE 2,678,026

PIG FEEDER

Edward O. Rue and Arthur G. Fredeen, Spicer, Minn., assignors, by direct and mesne assignments, to A. R. Wood Manufacturing Company, Luverne, Minn., a corporation of Minnesota Application November 14, 1952, Serial No. 320,528

1 Claim. (Cl. 119—73)

This invention relates to farm equipment, and more particularly to a device for use in feeding young pigs, lambs, and other farm animals.

The primary object of this invention is to provide an improved feeding apparatus for young pigs, lambs, etc., which employs means for adequately feeding a suitable formula to readily simulate the food that nature would otherwise have furnished.

Another object of this invention is to provide a novel feeding apparatus having thermostatic units associated therewith for controlling the temperature of the formula contained.

The construction of this invention features an upwardly convex face adjacent which nipples are secured to as to insure that the formula of milk and other nutritional elements can reach the feeder nipples in entirety so as to prevent souring of the solution within the container and subsequent waste thereof.

These together with the various ancillary objects of the invention which will become apparent as the following description proceeds, are attained by this pig feeder, a preferred embodiment of which has been illustrated in the accompanying drawings, by way of example only, wherein.

Figure 1:
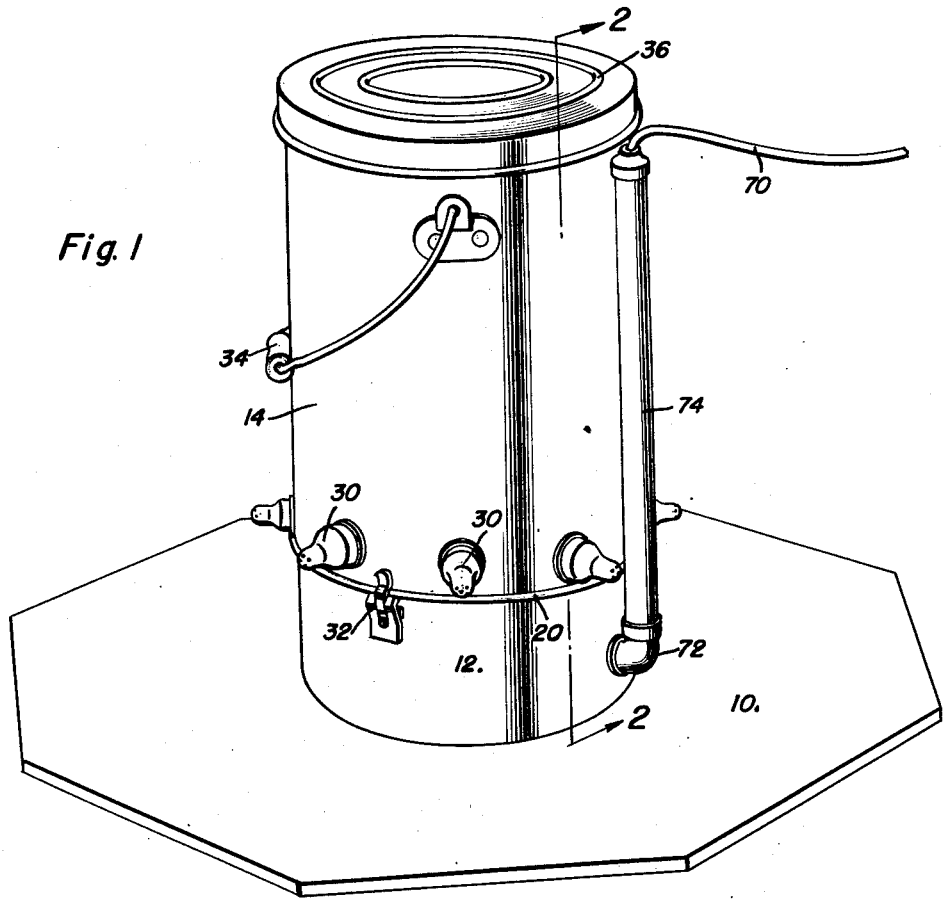
Figure 1 is a perspective view of one of the forms of the invention employing a heating unit in the base thereof.

With continuing reference to the accompanying drawings wherein like reference numerals designate similar parts throughout the various views, reference numeral 10 generally designates a stand which is of such size so as to prevent tilting of the pig feeder while permitting the pigs to readily rest thereon. Carried on the stand 10 is a base 12 having cylindrical side walls which are adapted to support a body portion 14 which forms the container for the formula to be fed the pigs. The body member 14 includes cylindrical side walls 16 and an upwardly convex bottom 18. A peripheral flange 20 is formed from the joining of the outer ends of the base 18 and the bottom portions of the side walls 16. The side walls 16 are perforated with a plurality of apertures 22, and nipple bushings 24 formed with a peripheral flange 26 are welded, brazed, or otherwise secured in alignment with the apertures 22. The nipple bushings 24 are provided with suitable apertures 28 therethrough for transferring the formula to nipples 30 which are detachably carried by the bushings 24. Cam fasteners 32 are secured to the cylindrical walls of the base 12 and are adapted to engage the flange 20 so as to detachably secure the body portion 14 on the base 12. A handle 34 of suitable design is attached to the body portion 14.

Figure 4:
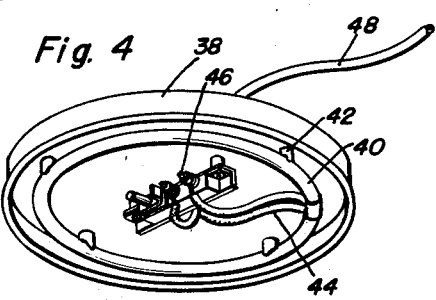
Figure 4 is a perspective view of a modified form of the heating unit as associated with the lid of the pig feeder.
Figure 2:
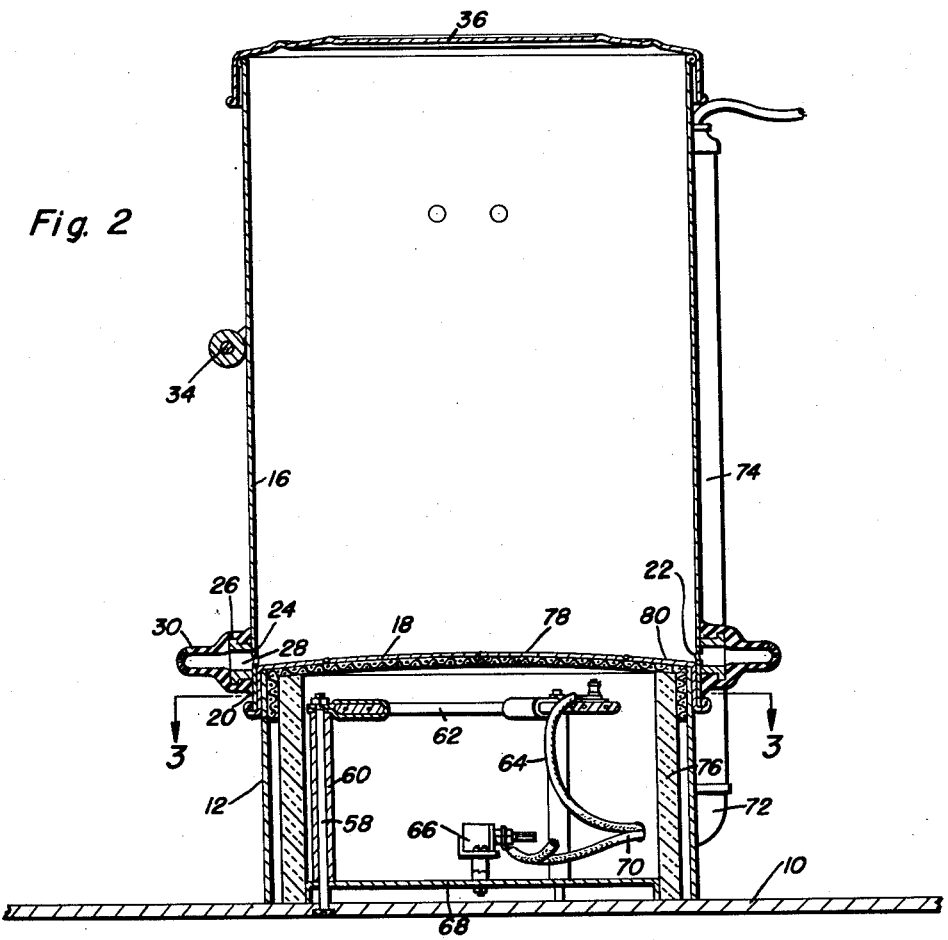
Figure 2 is an enlarged vertical sectional view as taken along the plane of line 2—2 in Figure 1, showing the construction of the interior of this pig feeder in greater detail.
Figure 3:
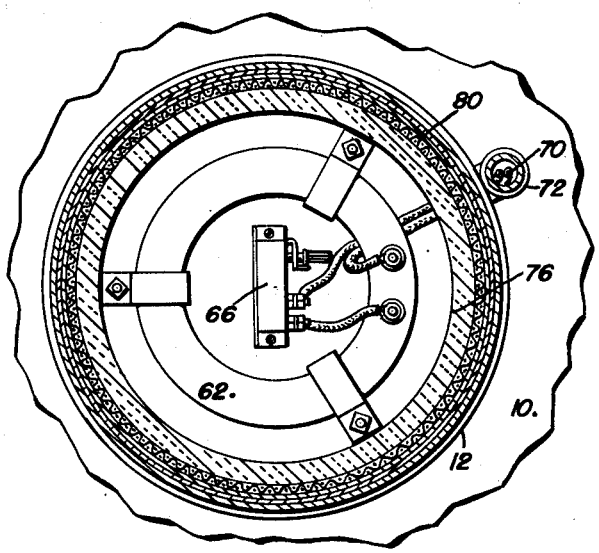
Figure 3 is a horizontal sectional view as taken along the plane of line 3—3 in Figure 2, and showing the construction of the heating unit in particular.

Supported by the body portion 14 is a lid 36. In the form of the invention as shown in Figures 1, 2 and 3, the lid is very simple in construction and performs merely the function of covering the body portion 14. However, referring now to Figure 4, it will be seen that herein is provided a lid 38 which includes a heating ring 40 suitably supported by and secured to supports 42 of any suitable design. The heating ring is operatively connected as by supports 44 to a thermostatic switch 46 of any convenient design. The thermostatic switch 46 is attached to the lid 38. A suitable conductor 48 is provided for connecting the electrical components to a source of power.

Figure 5:
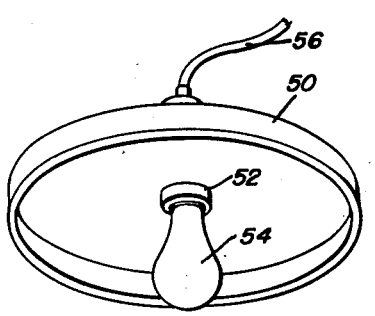
Figure 5 is a perspective view of yet another form of the heating element employing a lamp bulb for supplying heat.

Referring now to the form of lid as is shown in Figure 5, it will be seen that herein the lid 50 is provided with a socket 52 in which a light bulb 54 is adapted to be secured. A conductor 56 is operatively connected to the socket 52 for connecting the light bulb 54 with a source of current. Either the heating element 40 or the lamp 54 is provided to adequately heat the solution contained in the body portion 14 to a degree simulating the temperature of the natural supply of milk. Obviously the source of light may be of such type as to produce ultra-violet light so as to continuously sterilize the formula and aid in keeping such solution from souring.

Referring now to the form of the invention as shown in Figure 3; there are provided a plurality of vertically extending members 58 which are secured to the stand 10. These members 58 are suitably insulated by tubular insulating members 60 and support a heating ring 62 just under the bottom 18. The ring 62 is operatively connected by suitable conductors 64 to a thermostatic element 66 carried by a plate 68 secured to the stand 10. The electrical components of this heating unit and of the thermostatic element are connected through suitable conductors 70 to a source of electrical power. The conductor 70 extends through an elbow member 72 and a pipe 74 which is supported by the base 12 and the body portion 16 in any convenient manner. A tubular layer of insulation 76 is provided and shields the base 12 from the heating ring 62 so as to adequately prevent any of the little pigs or lambs from becoming burned.

In operation, this device is quite simple. The upwardly convex base serves to drain the formula into the nipples 30. This causes all of the formula to be available to the pigs and prevents any loss thereof. The thermostatic element 66 or 46 adequately controls the temperature so that the formula is heated a predetermined amount so as to readily simulate the food that nature furnishes.

Figure 6:
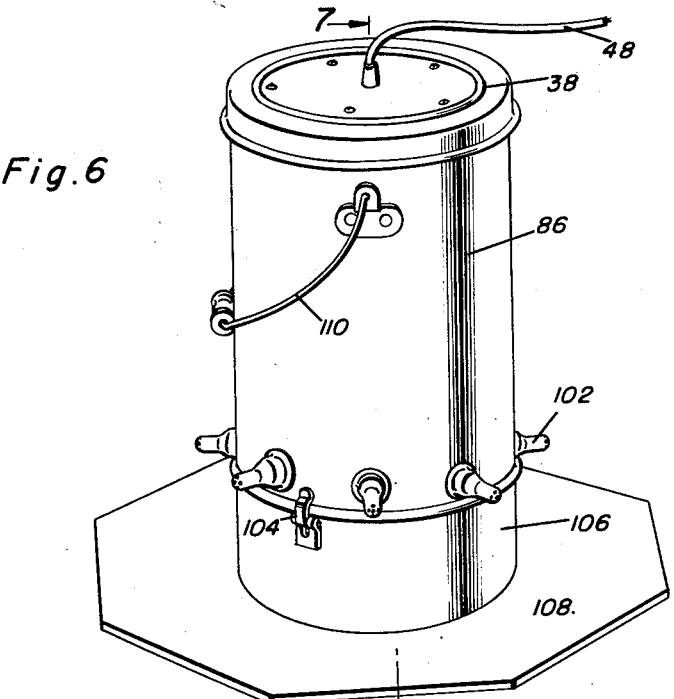
Figure 6 is a perspective view of a pig feeder employing the heating unit illustrated in Figure 4.
Figure 7:
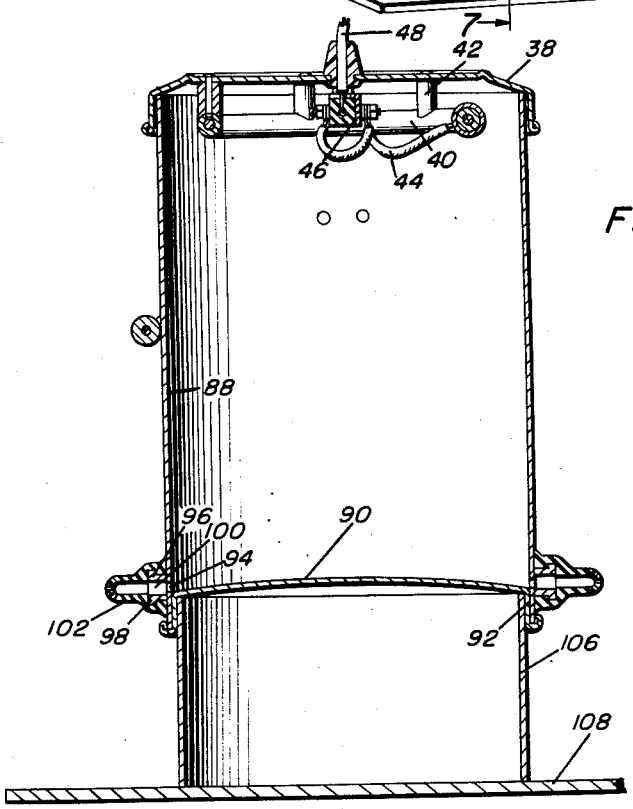
Figure 7 is an enlarged vertical sectional view as taken along the plane of line 7—7 of Figure 6.

In the embodiment of the invention as is shown in Figures 6 and 7, a lid 38 is secured on a body member 86 having cylindrical side walls 88 and an upwardly convexed bottom 90. A peripheral flange 92 is formed from the joining of the outer ends of the base 90 and the bottom portions of the side walls 88. The side walls 88 are perforated with a plurality of apertures 94 and nipple bushings 96 formed with a pheripheral flange 98 and welded, brazed, or otherwise secured in alignment with the apertures 94. The nipple bushings 96 are provided with suitable apertures 100 therethrough for transferring the formula to the nipples 102 which are detachably carried by the bushings 96. Cam fasteners 104 or other suitable means are secured to the cylindrical walls of a base 106 which extend upwardly from a stand 108. A handle 110 of suitable design is attached to the body 86.

In the operation, the embodiment of the invention as is shown in Figures 6 and 7 functions to provide a heated solution to the nipples 102. The thermostatic element 46 adequately controls the temperature so that the formula is heated to a predetermined amount so as to readily simulate the food that nature furnishes.

Since from the foregoing, the construction and advantages of this pig feeder are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claim.

What is claimed as new is as follows:

A pig feeder comprising a body portion including cylindrical side walls and a upwardly convex bottom, a plurality of apertures in said side walls adjacent said bottom, nipple bushings secured to said side walls in communication with said apertures, and nipples over said bushings, said body portion being supported by a base portion, said base portion being secured to a stand, and a heating element for warming the contents of said body portion carried by said lid, and thermostatic means for selectively controlling the operation of said heating means secured to said lid, said heating element being suspended from said lid in surrounding relationship relative to said thermostatic means.

References Cited in the file of this patent

UNITED STATES PATENTS

| Number | Name | Date |
| --- | --- | --- |
| 476,310 | Reed | June 7, 1892 |
| 769,942 | Eisold | Sept. 13, 1904 |
| 1,719,100 | Chisholm | July 2, 1929 |
| 2,089,725 | Biledeou | Aug. 10, 1937 |
| 2,329,245 | Bruehl | Sept. 14, 1943 |
| 2,435,015 | Olson | Jan. 27, 1948 |
| 2,519,736 | Bradley | Aug. 22, 1950 |